United States Patent [19]

Hara et al.

[11] Patent Number: 4,917,725
[45] Date of Patent: Apr. 17, 1990

[54] PROCESS FOR TREATING ELECTRIC FURNACE DUST

[75] Inventors: Nobuyuki Hara; Yukitaka Anabuki; Katsutoshi Murakami, all of Tokyo; Mitsuhiko Harada, Kitakyushu, all of Japan

[73] Assignees: Nippon Steel Corporation, Tokyo; Nippon Magnetic Dressing Co., Ltd., Kitakyushu, both of Japan

[21] Appl. No.: 246,562

[22] Filed: Sep. 19, 1988

[51] Int. Cl.$^4$ ............................................. C22B 1/08
[52] U.S. Cl. ........................................ 75/752; 423/97; 423/108
[58] Field of Search ...................... 75/25; 423/97, 108

[56] References Cited

U.S. PATENT DOCUMENTS 4,758,268  7/1988  Bishop et al. ........................... 75/25
4,802,919  2/1989  Fey ........................................ 75/25

Primary Examiner—Melvyn J. Andrews
Attorney, Agent, or Firm—Jordan and Hamburg

[57] ABSTRACT

A process for treating electric furnace dust comprising mixing electric furnace dust and a reducing agent with a material for reducing the slag melting point, preheating the mixture, adding the preheated mixture to molten slag which is being subjected to bubbling using oxygen-containing gas, heating the whole mixture, collecting volatilized material, and cooling the remainder.

8 Claims, 1 Drawing Sheet

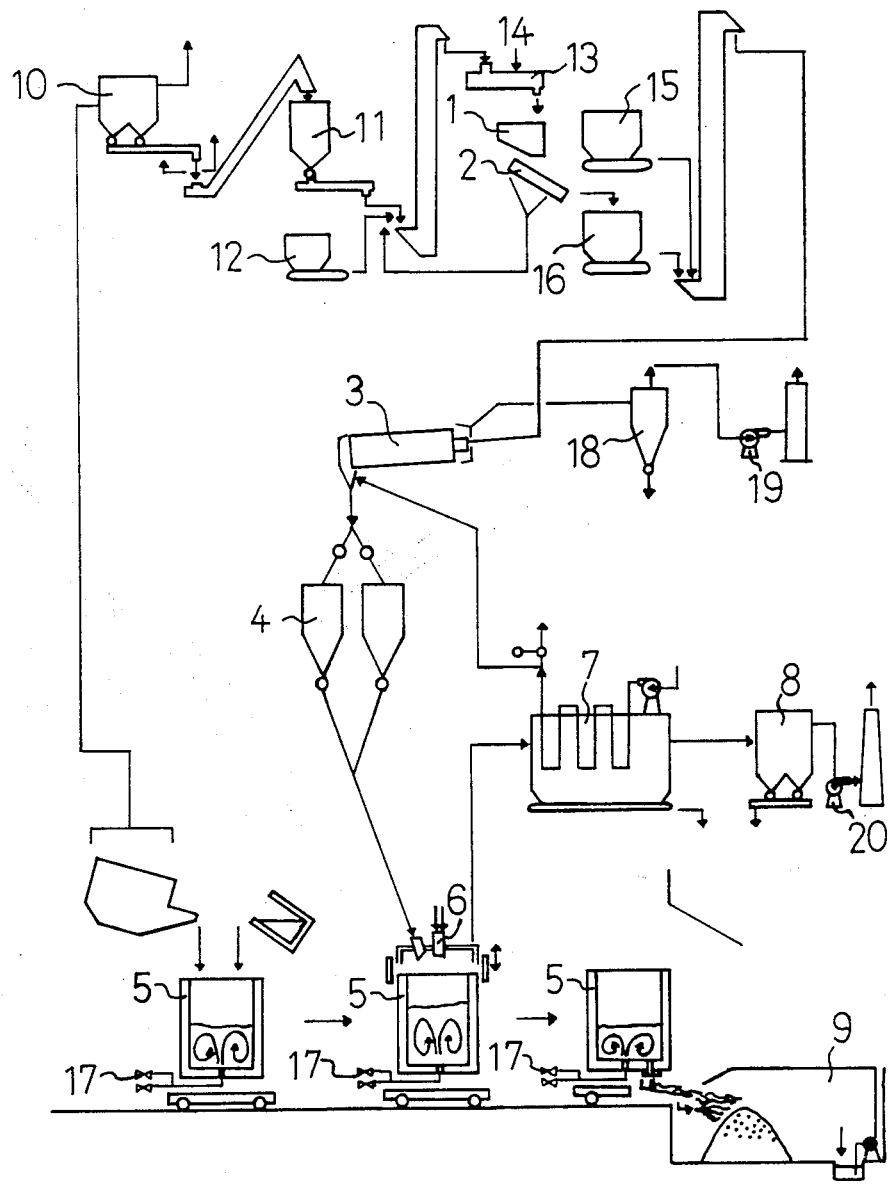

PROCESS FOR TREATING ELECTRIC FURNACE DUST

BACKGROUND OF THE INVENTION

The present invention relates to a method for treating dust or sludge. As used herein, the term "dust" includes dusts and sludges from electric furnaces.

The major constituent of electric furnace dust is metal oxides such as iron, zinc, lead, chromium and cadmium. These metals ideally can be reused, but it is difficult to reuse them as furnace materials because they contain large amounts of zinc. Even when such dusts are used as reclamation materials, harmful metals such as chromium, cadmium and lead are prone to dissolution by rain water etc., so that various treatments are required to prevent the dissolution of harmful metals, which requires a lot of time.

Processes for treating electric furnace dust are disclosed by the present inventors in Japanese Publications of Examined Patent Applications No. SHO60-23870 and No. SHO60-28897. These techniques relate to a process in which electric furnace dust is introduced into a molten steelmaking slag, a molten reaction occurs utilizing the sensible heat of the slag, zinc and lead are recovered by volatilization and the remainder is recovered.

The inventors of the present invention have adopted conventional techniques and have achieved conventional results. However, it has been found that there is room to vastly improve those conventional techniques.

Molten steelmaking slag has enormous sensible heat, but the quantity of heat is deficient for the purpose of achieving a sufficient reaction and efficiently volatilizing zinc and lead.

SUMMARY OF THE INVENTION

It is an object of the present invention to provide a process for treating electric furnace dust, in which the deficiency in the quantity of heat is solved by pretreating a volatilized product to be added to molten slag, bubbling the reaction furnace contents using oxygen containing gas, and further heating. Therefore, an abundant amount of treated dust is obtained, the relative ratio of dust and molten slag employed can be varied widely, and a highly efficient treatment is achieved.

An object of the present invention is achieved by a process in which a separate agglomeration or a mixed agglomeration of electric furnace dust and a reducing agent is mixed with a material for reducing the slag melting-point, the mixture is preheated, the preheated mixture is added to a molten steelmaking slag which is undergoing bubbling using oxygen containing gas, the whole mixture is further heated, the volatilized materials produced by the heating are collected and the remainder is cooled to solidify. At least one of coke, coal, Al dross, Mg dross and Fe-Si are used as the reducing agent. At least one of mineral or weathering silicate, coal ash, glass waste, Cu calamin (slag from copper smelting), Zn calamin (slag from zinc smelting), red mud, flaky silica and Shirasu are used as the material for reducing the slag melting-point. Shirasu is deposited silaceous volcanic ash.

It is possible to choose flame heating using a burner, etc., heating in which various fuels are fed and combusted in the reaction furnace, or heating using electric energy as the heating for the whole mixture in the reaction furnace in which molten steelmaking slag is accommodated and the above addition is added.

Also, it is possible to choose natural cooling or forced cooling in the reaction furnace, or natural cooling or forced cooling such as air cooling or water cooling as the later cooling of the remainder which the reactiion creates in the reaction furnace. However, forced cooling using a water current jet system is the most effective process in terms of harmlessness, because the treated product is vitrified.

BRIEF DESCRIPTION OF THE DRAWING

The sole FIGURE is a schematic diagram illustrating an example of a method of the present invention.

DETAILED DESCRIPTION OF THE INVENTION

An example of the present invention will now be explained in detail in conjunction with the FIGURE.

The chemical components of steelmaking slags and electric furnace dust, as an example, are shown in the following Table 1.

TABLE 1

| specimen | component | | | |
|---|---|---|---|---|
| | CaO$_2$ | SiO$_2$ | MgO | Al$_2$O$_3$ |
| electric furnace slags (oxidizing period) | 30.04 | 22.38 | 4.11 | 6.82 |
| electric furnace slags (reducing period) | 42.46 | 20.30 | 11.25 | 12.91 |
| converter slags | 46.2 | 26.6 | 6.3 | 7.9 |
| electric furnace dust | 7.65 | 3.28 | 0.87 | 0.92 |

| T.Fe | MnO | Zn | Pb | C | Cl | Cd | Cr |
|---|---|---|---|---|---|---|---|
| 17.11 | 4.80 | 0.03 | 0.002 | — | — | tr | 0.79 |
| 1.57 | 0.56 | 0.05 | 0.002 | — | — | tr | 0.45 |
| 0.7 | — | — | — | — | — | — | — |
| 24.44 | 2.61 | 18.82 | 0.98 | 1.36 | 0.89 | 0.06 | 0.39 |

| | | | | | (wt. %) |
|---|---|---|---|---|---|
| | As | Na$_2$O | K$_2$O | P | S |
| | tr | 0.42 | 0.50 | 0.342 | 0.092 |
| | tr | 0.51 | 0.39 | 0.100 | 0.210 |
| | — | 0.1 | 0.0 | — | — |
| | tr | 2.87 | 3.01 | 0.046 | 0.238 |

Illustrative materials for reducing the slag melting-point and their chemical components are shown in the following Table 2.

TABLE 2

| Specimen | analytical value (wt. %) | | | | | | |
|---|---|---|---|---|---|---|---|
| | SiO$_2$ | Al$_2$O$_3$ | T.Fe | CaO | MgO | Na$_2$O | K$_2$O |
| granite | 70.9 | 14.2 | 3.3 | 0.7 | 0.6 | 2.2 | 1.4 |
| sandstone | 71.5 | 14.0 | 3.1 | 0.9 | 0.4 | 1.9 | 1.3 |
| slate | 57.6 | 21.5 | 3.6 | 0.6 | 0.5 | 2.1 | 0.9 |
| molding wastesand | 86.1 | 3.0 | 0.2 | 2.2 | 0.1 | 1.0 | 1.1 |
| brick waste | 41.5 | 56.7 | 0.6 | 0.6 | 0.5 | 0.2 | 0.0 |
| weathered granite | 70.2 | 14.5 | 3.1 | 3.3 | 1.6 | — | — |
| calamin | 29.0 | 17.4 | 28.7 | 12.1 | 2.8 | — | — |
| coal ash | 50.9 | 24.1 | 4.5 | 9.7 | 2.1 | 1.2 | 0.0 |
| red mud | 9.8 | 21.1 | 30.9 | 3.5 | 0.7 | 3.0 | 0.1 |
| Shirasu | 70.5 | 13.10 | 0.64 | 1.53 | 0.48 | 3.6 | 3.0 |

Treatment according to the schematic drawing was done using the raw materials shown in Table 1 and Table 2.

Quantitative proportions of each raw material are also explained in detail as an example as follows. About one tenth of coal powder for electric furnace dust was added and was mixed with a proper amount of water.

The mixture was agglomerated by a pelletizer 1, and sieved by a screen 2. +7 mm objects were recovered (−7 mm objects are inserted into the pelletizer 1 again), about one third for +7 mm objects of granite were added, the mixture was preheated to 150° C. in a rotary kiln 3, and the preheated mixture was thrown into a reaction furnace 5 through a storage basket 4.

One part by weight of reducing period slag and about 3.5 parts by weight of oxidizing period slag were thrown into a reaction furnace 5, and about 2.0 tons of the above preheated mixture was thrown into the reaction furnace 5 for 5.8 tons of an electric furnace slag. Oxygen gas was blown from a bottom of the reaction furnace in advance into the electric furnace slag in the reaction furnace. The bubbling of the oxygen gas was kept up at the time the preheated mixture was thrown into the reaction furnace and subsequently the mixture was heated by a burner from a top of the reaction furnace.

Also, the waste gases from the reaction furnace were collected sequentially in a gas cooler 7 and bag filter 8, the volatilized material mainly composed of oxides of zinc and lead was recovered, and the high-temperature gases arising from the reaction furnace were introduced into the rotary kiln 3 through gas cooler 7 as a preheating heat source.

In the above example, the waste gases from the reaction furnace 5 were introduced into the rotary kiln 3 and were used for a preheating of briquettes. However, these gases were introduced into the reaction furnace again because of their considerably high temperature and were able to be used again for a heating source of the whole mixture.

The remainder in the reaction furnace was thrown into a cooling water pit 9 and solidified.

Additionally, in the FIGURE, 10 is a bagfilter, 11 is a hopper for the electric furnace dust, 12 is a hopper for the reducing agent, 13 is a mixer, 14 is mixing water, 15 is a hopper for the material for reducing slag melting-point, 16 is a hopper for the agglomerations, 17 is a bubbling pipe, 18 is a cyclone and 19 and 20 are blowers.

As a result, about 0.37 tons of volatilized material and dust was recovered from the bagfilter, the remainder was about 7.1 tons and the metal was about 0.46 tons.

From the results of the above example the total components of the volatilized material and the dust recovered by the bagfilter and the components of the remainder are shown in the following Table 3. The results of a solution test based on the standards of the U.S. Environmental Protection Agency are shown in the following Table 4.

TABLE 3

| | | | | | | (wt. %) |
|---|---|---|---|---|---|---|
| | | | component | | | |
| | | | CaO | $SiO_2$ | MgO | |
| volatilized material and dust | | | 3.20 | 1.22 | 0.30 | |
| remainder | | | 27.7 | 22.1 | 4.8 | |
| $Al_2O_3$ | T.Fe | MnO | Zn | Pb | C | Cl | Cd | Cr |
| 0.28 | 0.44 | 0.05 | 45.12 | 1.34 | 0.92 | 2.50 | 0.22 | 0.02 |
| 7.6 | 15.9 | 3.60 | 0.66 | 0.02 | — | — | — | 0.65 |
| | | | $Na_2O$ | $K_2O$ | P | S | | |
| | | | 4.30 | 5.00 | 0.03 | 0.42 | | |
| | | | 0.83 | 0.79 | 0.24 | 0.12 | | |

TABLE 4

| component | As | Ba | Cd | $Cr^{+6}$ | Pb | Se | Ag | T.Hg (mg/l) |
|---|---|---|---|---|---|---|---|---|
| remainder | ND | 0.44 | 0.01 | 0.04 | 0.0008 | ND | 0.01 | — |

Calculating using the composition of the material components shown in Table 1, the volatilizing ratio of zinc in the example was about 86%, and the volatilizing ratio of lead was about 92%.

As a result of X-ray analysis, it was determined that the remainder mainly contains $2CaO.Al_2O_3.SiO_2$, $2CaO.Fe_2O_3$, $4CaO.Al_2O_3.Fe_2O_3$, etc., and F.CaO or $\gamma\text{-}2CaO.SiO_2$ were hardly observed, and their collapse ratio in a collapse test using an autoclave was zero or negligible.

In the present invention, as shown in the above example, an electric furnace dust and a reducing agent are first mixed and agglomerated. Then, the agglomeration and a material for reducing the slag melting-point such as a silicate are further mixed and are added to the molten slag. Therefore, the volatilization ability of zinc and lead is remarkably increased, and each of zinc and lead is recovered at a high efficiency as shown in Table 3.

The material for reducing the slag melting-point is added to a molten slag, is preheated, is forced-heated in the reaction furnace and is further treated by bubbling with gases such as oxygen gas or oxygen-containing gas. Therefore, the molten steelmaking slag is not solidified because of adding the reaction heat of oxygen gas and a reducing agent and the reaction heat of oxygen gas and FeO etc. in a molten steelmaking slag. As a result, it is possible to maintain a molten reaction and volatilizing reaction for many hours. The remainder after the molten reaction is composed of stable and harmless materials because of the non-collapse in the slag of the material for reducing the slag melting-point and the non-dissolution of harmful metal such as heavy metals.

As a result of another example, in which amounts of the electric furnace dust and the reducing agent are used in varying ratios, almost the same results as in the above example were obtained.

As mentioned above, the present invention relates to a process for treating electric furnace dust using a molten steelmaking slag produced in conventional factory processes. However, the charge dust is agglomerated in advance, preheated, and then thrown into the reaction furnace. Therefore, the sensible heat of the molten steelmaking slag is not abruptly removed, and a decrease in heat is not observed. Also, the bubbling treatment of a molten steelmaking slag is not merely accomplished using a gas having only a bubbling function but is accomplished using a gas containing reaction furnace contents and oxygen gas to yield a heat generation reaction.

The whole mixture in the reaction furnace is individually further forced-heated. Therefore, it is possible to increase the temperature by at least 40°–50° C. using the reaction heat of FeO. Also, the reaction furnace contents do not solidify for many hours because a material for reducing the slag melting-point is also added to the reaction furnace and the flowability of the reaction contents in the furnace is raised. The reaction resulting in flowability is smooth, and also, heating energy is contributed.

Also, an agglomerated mixture is churned at a molten slag in the reaction furnace by agglomerating electric furnace dust (especially, the reducing materials inside agglomerating), and electric furnace dust is slagged after the zinc and lead, etc., are sufficiently reduced and volatilized. Therefore, the recovery of zinc and lead is great. In a conventional method, in which agglomeration is not provided, electric furnace dust is slagged very quickly by contact with a molten steelmaking slag, and therefore, zinc and lead are not sufficiently volatilized and are retained in the slag, so that the recovery of zinc and lead is low.

As a result, the treatment using steelmaking slag sensible heat is smoothly done without limiting the amount of the electric furnace dust. As shown in the results of the examples, the volatilizing ratio of zinc is about 86% and the volatilizing ratio of lead is about 92%, and these results demonstrate the recovery of useful metals at a high efficiency. The remainder is non-collapsible, harmful metals do not dissolve and advantages in operation abound.

We claim:

1. A process for treating electric furnace dust comprising mixing agglomerated electric furnace dust and an agglomerated reducing agent with a material for reducing the melting point of slag to form a mixture; preheating the mixture; bubbling an oxygen-containing gas into molten steelmaking slag in a reaction furnace; mixing said preheated mixture with said molten steelmaking slag in said reaction furnace while continuing said bubbling to form a reaction furnace contents; heating the reaction furnace contents to produce waste gases containing volatilized materials and a molten remainder material; recovering the volatilized materials from said waste gases, and cooling the molten remainder material to solidify the remainder material.

2. A process for treating electric furnace dust according to claim 1, wherein said reducing agent is selected from the group consisting of coke, coal, Al dross, Mg dross, Fe-Si and mixtures thereof.

3. A process for treating electric furnace dust according to claim 1, wherein said material for reducing the melting point of slag is selected from the group consisting of silicate crag, silicate mineral, silicage weathering, coal ash, glass waste, zinc smelting slag, copper smelting slag, red mud, flaky silica, deposited silaceous volcanic ash and mixtures thereof.

4. A process for treating electric furnace dust according to claim 1, wherein said agglomerated electric furnace dust and said agglomerated reducing agent comprise an agglomerated mixture of electric furnace dust and reducing agent.

5. A process for treating electric furnace dust according to claim 1, wherein said mixture is preheated to about 150° C. before mixing with said molten steelmaking slag.

6. A process for treating electric furnace dust according to claim 1, wherein said volatilized material comprises zinc oxides and lead oxides.

7. A process for treating electric furnace dust according to claim 1 further comprising, after recovering said volatilized materials from said waste gases, recycling, said waste gases for said preheating of said mixture.

8. A process for treating electric furnace dust according to claim 7 further comprising, after preheating the mixture with said waste gases, recyling said waste gases for said heating of said reaction furnace contents.

* * * * *